(12) United States Patent
Kinoshita et al.

(10) Patent No.: US 9,145,126 B2
(45) Date of Patent: Sep. 29, 2015

(54) SHIFT-BY-WIRE CONTROL SYSTEM

(71) Applicant: Fuji Jukogyo Kabushiki Kaisha, Tokyo (JP)

(72) Inventors: Takahiro Kinoshita, Tokyo (JP); Koichi Inoue, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 13/794,587

(22) Filed: Mar. 11, 2013

(65) Prior Publication Data

US 2013/0252785 A1 Sep. 26, 2013

(30) Foreign Application Priority Data

Mar. 23, 2012 (JP) ................................. 2012-067696

(51) Int. Cl.
*F16H 59/50* (2006.01)
*B60W 10/11* (2012.01)
*B60W 10/06* (2006.01)
(Continued)

(52) U.S. Cl.
CPC ............... *B60W 10/11* (2013.01); *B60K 28/12* (2013.01); *B60W 10/06* (2013.01); *B60W 10/10* (2013.01); *B60W 10/182* (2013.01); *B60W 30/18018* (2013.01); *F16H 59/08* (2013.01); *F16H 61/12* (2013.01); *B60W 2520/10* (2013.01); *B60W 2550/142* (2013.01); *B60Y 2400/76* (2013.01); *F16H 59/50* (2013.01); *F16H 61/18* (2013.01); *F16H 2061/1208* (2013.01);
(Continued)

(58) Field of Classification Search
USPC ...................................................... 477/97, 99
See application file for complete search history.

(56) References Cited

U.S. PATENT DOCUMENTS 4,892,014 A * 1/1990 Morell et al. .................... 477/92
2008/0264190 A1* 10/2008 Nishimura ....................... 74/335
(Continued)

FOREIGN PATENT DOCUMENTS

CN 101511652 A 8/2009
JP 64-17059 1/1989
(Continued)

OTHER PUBLICATIONS

Chinese Office Action dated Dec. 22, 2014 with Japanese translation.

*Primary Examiner* — Ramya Burgess
*Assistant Examiner* — Lillian Nguyen
(74) *Attorney, Agent, or Firm* — McGinn IP Law Group, PLLC

(57) ABSTRACT

There is provided a shift-by-wire control system including a range switching device that switches engagement or disengagement of a forward engagement element and a reverse engagement element by using an actuator, a range switching operation unit by which a driver inputs a range switching operation, and a range switching control unit that controls the actuator of the range switching device on the basis of the state of the range switching operation unit. The shift-by-wire control system further includes vehicle start preparation state determination units for determining a vehicle start preparation state. When the vehicle start preparation state determination unit determines that the vehicle start preparation state is incomplete, the range switching control unit executes running prohibition control by which the forward engagement element and the reverse engagement element are all disengaged, regardless of the state of the range switching operation unit.

15 Claims, 3 Drawing Sheets

(51) Int. Cl.
  *B60K 28/12*     (2006.01)
  *B60W 10/10*    (2012.01)
  *B60W 10/18*    (2012.01)
  *B60W 30/18*    (2012.01)
  *F16H 59/08*    (2006.01)
  *F16H 61/12*    (2010.01)
  *F16H 61/18*    (2006.01)

(52) U.S. Cl.
  CPC .......... *F16H 2312/20* (2013.01); *Y10T 477/65* (2015.01); *Y10T 477/656* (2015.01)

(56) References Cited

U.S. PATENT DOCUMENTS

| | | | |
|---|---|---|---|
| 2009/0326767 A1 | 12/2009 | Kamada et al. | |
| 2011/0087386 A1* | 4/2011 | Steinhauser et al. | 701/2 |
| 2011/0105273 A1* | 5/2011 | Tabuchi et al. | 476/10 |
| 2012/0253615 A1* | 10/2012 | Kamada et al. | 701/51 |

FOREIGN PATENT DOCUMENTS

| | | |
|---|---|---|
| JP | 2004-324849 A | 11/2004 |
| JP | 2008-128475 A | 6/2008 |

\* cited by examiner

SHIFT-BY-WIRE CONTROL SYSTEM

CROSS-REFERENCE TO RELATED APPLICATIONS

The present application claims priority from Japanese Patent Application No. 2012-067696 filed on Mar. 23, 2012, the entire contents of which are hereby incorporated by reference.

BACKGROUND OF THE INVENTION

1. Field of the Invention

The present invention relates to a shift-by-wire control system that performs range switching of an automatic transmission by using actuators, and more particularly to a system that performs adequately switching to a non-running range according to the vehicle state.

2. Description of the Related Art

In an automatic transmission such as a CVT or a planetary gear step AT provided at an automobile or the like, the drive, reverse, and neutral ranges are switched by controlling the oil pressure supplied to engagement elements such as a forward clutch and a reverse clutch.

Switching of such drive, reverse, and neutral ranges has conventionally been performed by a manual valve connected by a mechanical linkage to an operation lever operated by the driver.

A so-called shift-by-wire system, in which switching of running ranges is performed only by electric signals, without providing a mechanical linkage between the operation lever and the transmission, has recently been suggested.

As the conventional techniques relating to shift-by-wire systems of automatic transmission, for example, Japanese Unexamined Patent Application Publication (JP-A) No. 2008-128475 describes a range switching device in which spool valves are actuated by three respective solenoid valves to switch the oil pressure supplied to drive and reverse hydraulic servers.

Further, JP-A No. 2004-324849 describes a shift-by-wire system in which a park lock mechanism is automatically actuated when the ignition switch is OFF, wherein when the range of the automatic transmission is other than the P range in a state with the ignition switch being OFF, the range of the automatic transmission is set to the P range, regardless of the shift switch position, and when the ignition switch is switched from ON to OFF and the shift switch is in a range other than the P range, range switching of the automatic transmission is prohibited till the shift switch is in the P range.

Japanese Unexamined Utility Model Application Publication No. S64-17059 describes a shift-by-wire system in which a drive motor that switches gear ranges is controlled on the basis of signals from a gear indication switch, wherein a vehicle speed signal from a vehicle speed sensor and an ON/OFF signal of an ignition switch are inputted to a control circuit, and an automatic return to a parking range is performed when the vehicle is parked with the ignition switch being turned off.

From the standpoint of safety, it is undesirable that a vehicle in which shift-by-wire control is performed be driven when the driver has not buckled a seat belt or the driver's door is opened and the vehicle is not prepared for running.

Further, in the case where the voltage supplied to the system drops, a CPU or actuators can also malfunction and it is undesirable that the vehicle be driven is such a case.

When the automatic restart of the engine is prohibited for some reason after the engine has been automatically stopped in the idle stop control, usually even if the driver tries to start the engine manually, since the automatic transmission is in the running range, the inhibitor circuit is disconnected, the stator cannot be energized, and the engine cannot be restarted.

Further, even if the inhibitor circuit is set ON and the energizing of the stator motor is allowed as exception processing, it is possible that the start operation be performed in a running range.

The correct operation to be conducted in such a case involves performing an engine start operation after shifting temporarily to a no-running range, and then returning to the running range, but such an operation places a large load on the driver in emergency situations and the driver can fall into panic.

SUMMARY OF THE INVENTION

With the foregoing in view, it is an object of the present invention to provide a shift-by-wire control system that can perform adequately switching to a non-running range according to the vehicle state.

A first aspect of the present invention provides a shift-by-wire control system including: a range switching device that switches engagement or disengagement of a forward engagement element and a reverse engagement element by using an actuator; a range switching operation unit by which a driver inputs a range switching operation; and a range switching control unit that controls the actuator of the range switching device on the basis of a state of the range switching operation unit, the shift-by-wire control system further including a vehicle start preparation state determination unit for determining a start preparation state of a vehicle, wherein when the vehicle start preparation state determination unit determines that the vehicle start preparation state is incomplete, the range switching control unit executes running prohibition control by which the forward engagement element and the reverse engagement element are all disengaged, regardless of the state of the range switching operation unit.

With such a configuration, when the vehicle is not prepared for running, the vehicle can be prevented from moving and safety can be increased by disengaging the forward engagement element and the reverse engagement element.

Preferably, the vehicle start preparation state determination unit determines that the vehicle start preparation state is incomplete when a driver's seat belt is not buckled.

Preferably, the vehicle start preparation state determination unit determines that the vehicle start preparation state is incomplete when a driver's door is open.

With such configurations, the vehicle start preparation state can be determined easily and at a low cost by using the already available sensors, switches, and the like provided at a typical vehicle.

Preferably, the range switching control unit executes the running prohibition control when a voltage supplied from a power supply is equal to or less than a predetermined value.

With such a configuration, when the voltage supplied to the system drops and CPU or actuator for control can malfunction, the vehicle can be prevented from running and reliability and safety can be ensured.

Preferably, the shift-by-wire control system further includes an idle stop control unit that automatically stops an engine of the vehicle when the vehicle is stopped, automatically restarts the engine according to a vehicle start preparation operation, and prohibits the automatic restart of the engine when a predetermined automatic restart prohibition condition is fulfilled, wherein when the idle stop control unit prohibits the automatic restart of the engine, the range switching control unit executes the running prohibition control and allows a starter motor to be driven in response to an engine start operation by the driver.

With such a configuration, when the automatic restart of the engine by the idle stop control is prohibited for some reason, the stator motor can be driven without manual switching to a non-running range by the driver. Further, since the vehicle does not move at this time, the operation load on the driver can be reduced and it is possible to keep the driver from falling into panic.

A second aspect of the present invention provides a shift-by-wire control system including: a range switching device that switches engagement or disengagement of a forward engagement element and a reverse engagement element by using an actuator; a range switching operation unit by which a driver inputs a range switching operation; and a range switching control unit that controls the actuator of the range switching device on the basis of a state of the range switching operation unit, wherein the range switching control unit executes running prohibition control by which the forward engagement element and the reverse engagement element are all disengaged, regardless of the state of the range switching operation unit, when a voltage supplied from a power supply is equal to or less than a predetermined value.

A third aspect of the present invention provides a shift-by-wire control system, including: a range switching device that switches engagement or disengagement of a forward engagement element and a reverse engagement element by using an actuator; a range switching operation unit by which a driver inputs a range switching operation; and a range switching control unit that controls the actuator of the range switching device on the basis of a state of the range switching operation unit, the shift-by-wire control system further including an idle stop control unit that automatically stops an engine of the vehicle when the vehicle is stopped, automatically restarts the engine according to a vehicle start preparation operation, and prohibits the automatic restart of the engine when a predetermined automatic restart prohibition condition is fulfilled, wherein when the idle stop control unit prohibits the automatic restart of the engine, the range switching control unit executes running prohibition control by which the forward engagement element and the reverse engagement element are all disengaged and allows a starter motor to be driven in response to an engine start operation by the driver, regardless of the state of the range switching operation unit.

Preferably, an output shaft of the automatic transmission is locked by a lock mechanism in the case where a road slope in a front-rear direction is equal to or greater than a predetermined value when the vehicle is stopped and the running prohibition control is executed.

Preferably, brake devices provided at wheels are set to a braking state in the case where a road slope in a front-rear direction is equal to or greater than a predetermined value when the vehicle is stopped and the running prohibition control is executed.

With such configurations, the vehicle can be prevented from moving and safety can be further increased when the vehicle stops on a slope as the running prohibition control is being executed.

Preferably, the shift-by-wire control system further includes a self-shut relay that interrupts power supply to the range switching device after a predetermined time period elapses since an OFF operation of an ignition switch; and a self-shut prohibition unit that prohibits the interruption of power supply by the self-shut relay, regardless of a state of an input signal from the ignition switch, when a running speed of the vehicle is equal to or higher than a predetermined value.

With such a configuration, it is possible to prevent the self-shut from being actuated and interrupting power supply to the system which makes control impossible, even when a failure occurs, for example, in the ignition switch or the wiring thereof.

DESCRIPTION OF THE PREFERRED EMBODIMENTS

In accordance with the present invention, the object of providing a shift-by-wire control system that adequately performs switching to a non-running range according to the vehicle state is attained by disengaging the forward clutch and reverse clutch when the driver's door is open, when the seatbelt is not buckled, when the voltage supplied from the battery is low, and during automatic restart inhibition in the idle stop system.

Embodiment

An embodiment of a shift-by-wire system according to the present invention is explained below.

The shift-by-wire system of this embodiment performs range switching in an automatic transmission such as a CVT or a step AT that is installed on an automobile such as a passenger car that uses an engine such as a gasoline engine as a source of power for running.

Figure 1:
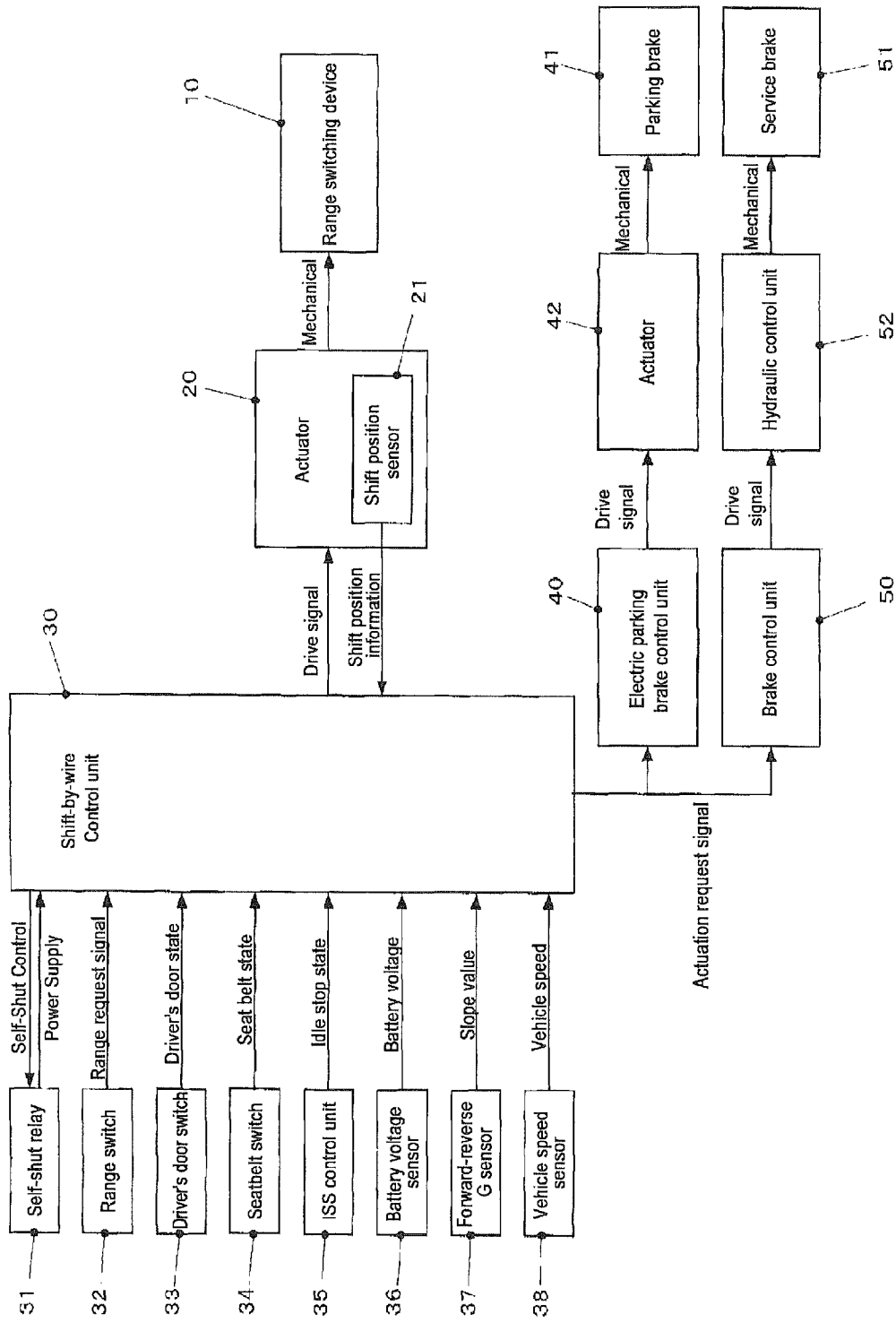
FIG. 1 is a schematic block diagram illustrating a configuration of an embodiment of a shift-by-wire control system according to the present invention.

FIG. 1 is a schematic block diagram illustrating the configuration of the shift-by-wire control system of this embodiment.

The shift-by-wire control system is constituted by a range shifting device 10, an actuator 20, and a shift-by-wire control unit 30.

In the range shifting device 10, a drive (D) range, a reverse (R) range, a neutral (N) range, and a parking (P) range of the automatic transmission are switched by the actuator 20.

The range switching device 10 has a hydraulic control mechanism that fastens and unfastens the forward clutch and reverse clutch, and a parking lock mechanism that mechanically locks the output shaft.

D range: a state in which the forward clutch is fastened and the reverse clutch is unfastened.

R range: a state in which the forward clutch is unfastened and the reverse clutch is fastened.

N range: a state in which both the forward clutch and the reverse clutch are unfastened.

P range: a state in which both the forward clutch and the reverse clutch are fastened and the parking lock mechanism is actuated.

The actuator 20 is an electric actuator, for example a motor or a solenoid, that operates the range switching device 10 to switch the ranges.

The actuator 20 is provided with a shift position sensor 21 that detects the range (shift position) of the range switching device 10 on the basis of the position of the internal drive member.

The shift position information detected by the shift position sensor 21 is transmitted to the shift-by-wire control unit 30.

The shift-by-wire control unit 30 controls the actuator 20 and performs the range switching operation in the range switching device 10.

The shift-by-wire control unit 30 has an information processing device such as a CPU, a memory device such as a RAM or ROM, an input/output interface, and a bus connecting those components.

A self-shut relay 31, a range switch 32, a driver's door switch 33, a seatbelt switch 34, an idling stop system (ISS) control unit 35, a battery voltage sensor 36, a forward-reverse G sensor 37, and a vehicle speed sensor 38 are connected to the shift-by-wire control unit 30 by a CAN communication system which is an on-board LAN.

The self-shut relay 31 supplies power to the shift-by-wire control unit 30 and also, when the driver switches OFF an ignition switch (not shown in the figure), supplies power till the shutdown of the shift-by-wire control unit 30 is completed and then interrupts power supply in response to a self-shut control signal from the shift-by-wire control unit 30.

The range switch 32 is provided at an operation section such as a shift lever that is used by the driver to input a range switching operation (selection operation) and transmits a range request signal corresponding to the range selected by the shift lever to the shift-by-wire control unit 30.

The shift-by-wire control unit 30 drives the actuator 20 and operates the range switching device 10 in response to the range request signal from the range switch 32.

The driver's door switch 33 is provided at the catcher of the driver's door, detects the open/closed state of the driver's door, and transmits the detection result to the shift-by-wire control unit 30.

The seatbelt switch 34 is provided at the seatbelt anchor portion of the driver's seat, detects the buckled/unbuckled state of the seatbelt, and transmits the detection result to the shift-by-wire control unit 30.

The driver's door switch 33 and the seatbelt switch 34 function as the vehicle start preparation state determination units in accordance with the present invention that determine the vehicle start preparation state in which the driver has buckled the seatbelt and closed the driver's door.

The ISS control unit 35 performs the idle stop control that automatically stops the engine when a predetermined idle stop condition is fulfilled when the vehicle is stopped and automatically restarts the engine, for example, when a predetermined restart condition such as a brake-off condition is fulfilled.

The ISS control unit 35 also has a function of inhibiting the automatic restart after the engine has automatically been stopped in the case where a predetermined restart prohibition conditions is fulfilled.

The battery voltage sensor 36 detects the voltage of the battery supplying power to the shift-by-wire control system and transmits the detection result to the shift-by-wire control unit 30.

The forward-rearward G sensor 37 determines the inclination (slope) of the road where the vehicle is stopped in the forward-rearward direction by detecting the acceleration acting on the vehicle in the forward-rearward direction.

The forward-rearward G sensor 37 transmits the determined slope value to the shift-by-wire control unit 30.

The vehicle speed sensor 38 generates a vehicle speed pulse signal corresponding to the rotation speed of the turn wheel provided, for example, on the wheel hub, and detects the vehicle speed according to the spacing of the vehicle speed pulse signals.

The vehicle speed sensor 38 transmits the detected vehicle speed to the shift-by-wire control unit 30.

The shift-by-wire control unit 30 is also connected to an electric parking brake control unit 40 and a brake control unit 50.

The electric parking brake control unit 40 controls an actuator 42 that is connected by a mechanical linkage to a mechanical parking brake 41 and performs the brake/release switching of the parking brake 41.

The brake control unit 50 controls a hydraulic control unit 52 that generates the fluid pressure in a hydraulic service brake 51 and performs the brake/release switching of the service brake 51.

The shift-by-wire control system of the above-described embodiment executes control for preventing the vehicle from running when the start preparation performed by the driver is incomplete, control for preventing the vehicle from running when the voltage supplied from the battery has dropped, and control for switching to a non-running range and setting ON the inhibit circuit when the engine is automatically stopped by the idle stop control and the automatic restart is thereafter prohibited.

Those controls are described below in greater detail.

Figure 2:
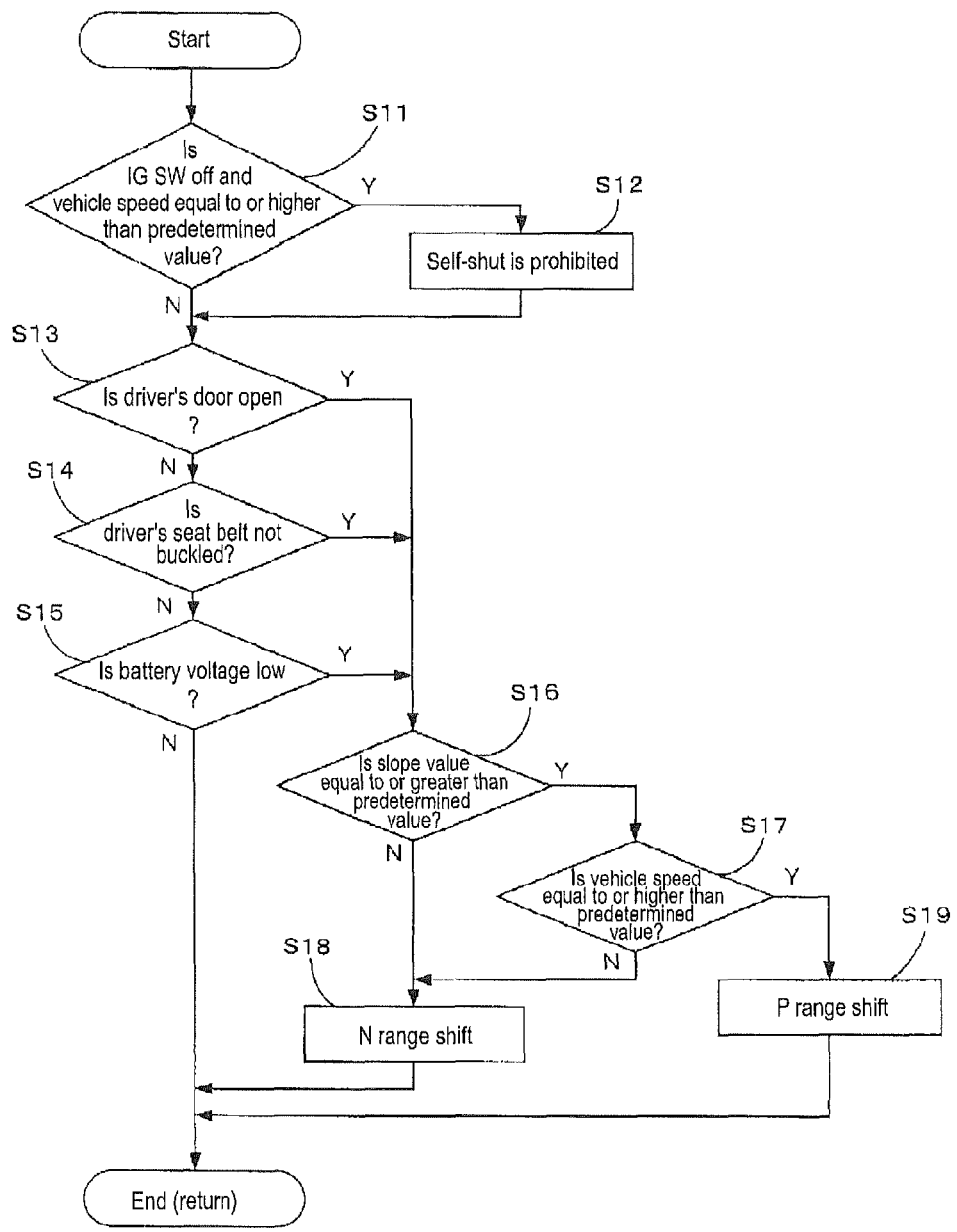
FIG. 2 is a flowchart illustrating control performed when the vehicle start preparation is incomplete and the voltage is low in the shift-by-wire control system illustrated in FIG. 1.

FIG. 2 is a flowchart illustrating control performed when the start preparation is incomplete and the voltage is low in the shift-by-wire control system shown in FIG. 1.

Each step is successively explained below.

<Step S11: State of Ignition Switch and Vehicle Speed is Determined>

The shift-by-wire control unit 30 determines whether or not the input signal from the ignition switch (not shown in the figure) is in the OFF state and whether or not the vehicle speed detected by the vehicle speed sensor is equal to or higher than a predetermined value. When both conditions are fulfilled, the processing advances to step S12.

Where either or both conditions are unfulfilled, the processing advances to step S13.

<Step S12: Self-Shut is Prohibited>

The shift-by-wire control unit 30 prohibits the power supply interruption (relay contact opening operation) to the shift-by-wire control unit 30 by the self-shut relay 31, and the processing advances to step S13.

<Step S13: Driver's Door State is Determined>

The shift-by-wire control unit 30 determines the open/closed state of the driver's door on the basis of the input from the driver's door switch 33. When the driver's door is open, the processing advances to step S16.

When the driver's door is closed, the processing advances to step S14.

<S14: Driver's Seatbelt State is Determined>

The shift-by-wire control unit 30 determines the seatbelt buckling state of the driver's seat occupant on the basis of the input from the seatbelt switch 34, and when the seatbelt is not buckled, the processing advances to step S16.

When the seatbelt is buckled, the processing advances to step S15.

<S15: Low Battery Voltage is Determined>

The shift-by-wire control unit 30 determines the battery voltage on the basis of the input from the voltage sensor 36. In the case of a low battery voltage in which the voltage is equal to or less than a predetermined threshold, the processing advances to step S16.

When the battery is not in the low-voltage state, the processing ends (return).

<Step S16: Slope Value is Determined>

The shift-by-wire control unit 30 determines the slope value, in the forward-rearward direction, of the road where the vehicle is presently stopped on the basis of the input from the forward-rearward G sensor 37. When the slope value is equal to or greater than a predetermined threshold, the processing advances to step S17.

When the slope value is less than the threshold, the processing advances to step S18.

<Step S17: Vehicle Speed is Determined>

The shift-by-wire control unit 30 determines the present vehicle speed on the basis of the input from the vehicle speed sensor 38. When the vehicle speed is equal to or less than a predetermined threshold, the processing advances to step S19.

When the vehicle speed is above the threshold, the processing advances to step S18.

<Step S18: N Range Shift>

The shift-by-wire control unit 30 disengages both the forward clutch and the reverse clutch of the automatic transmission to obtain a N range state in which the parking lock mechanism is released.

The processing then ends (return).

<Step S19: P Range Shift>

The shift-by-wire control unit 30 disengages both the forward clutch and the reverse clutch of the automatic transmission to obtain a P range state in which the parking lock mechanism is locked.

In this case, the parking lock mechanism may be locked, or instead of locking the parking lock mechanism, it is possible to transmit an actuation request signal to either or both the electric parking brake control unit 40 and the brake control unit 50 and set either or both the parking brake 41 and the service brake 51 in a brake state.

The processing then ends (return).

Figure 3:
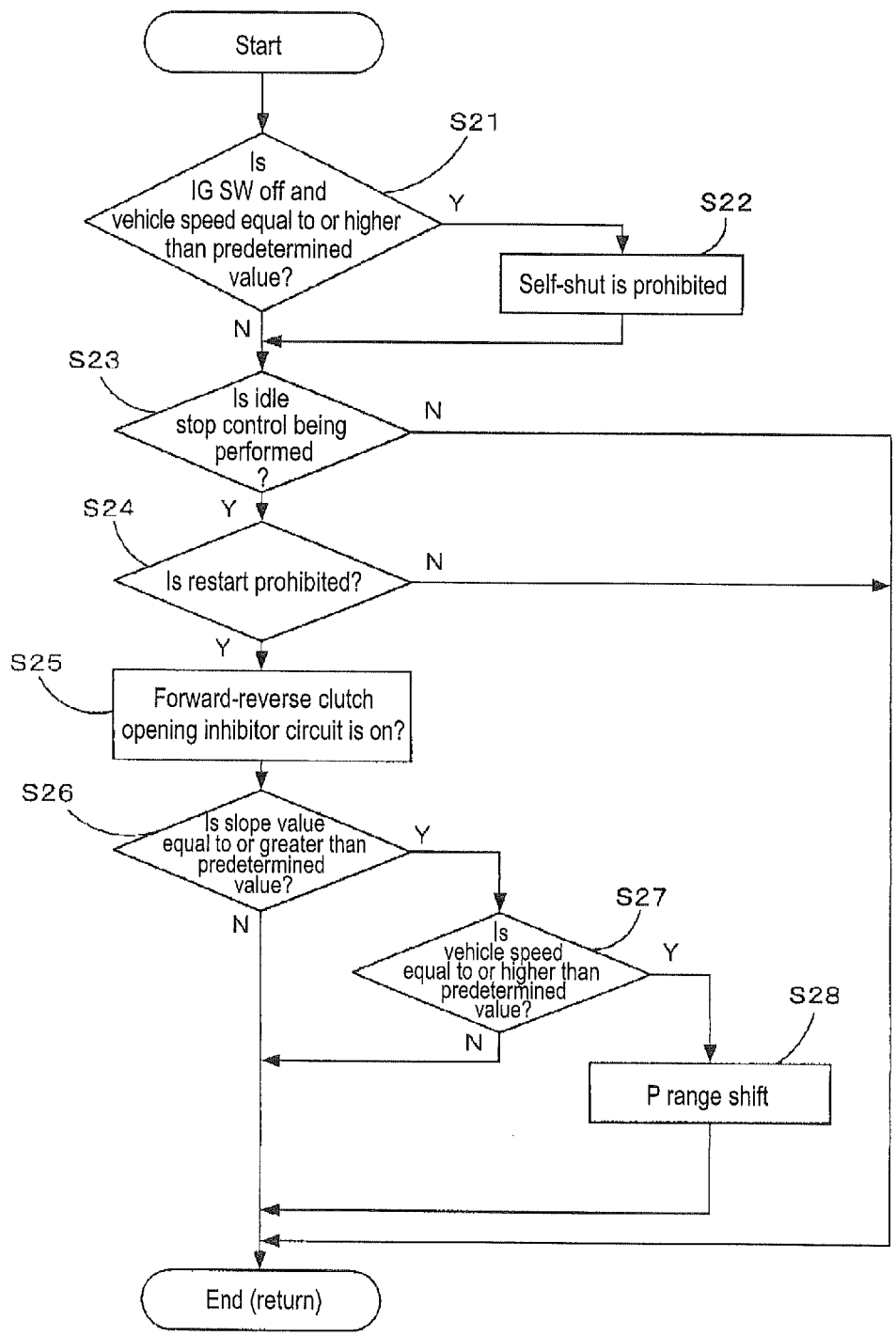
FIG. 3 is a flowchart illustrating control performed during idle stop restart prohibition in the shift-by-wire control system illustrated in FIG. 1.

FIG. 3 is a flowchart illustrating control performed during the idle stop restart prohibition in the shift-by-wire system shown in FIG. 1.

Each step is successively explained below.

<Step S21: State of Ignition Switch and Vehicle Speed is Determined>

The shift-by-wire control unit 30 determines whether or not the input signal from the ignition switch (not shown in the figure) is in the OFF state and whether or not the vehicle speed detected by the vehicle speed sensor is equal to or higher than a predetermined value. When both conditions are fulfilled, the processing advances to step S22.

Where either or both conditions are unfulfilled, the processing advances to step S23.

<Step S22: Self-Shut is Prohibited>

The shift-by-wire control unit 30 prohibits the power supply interruption (relay contact opening operation) to the shift-by-wire control unit 30 by the self-shut relay 31, and the processing advances to step S23.

<Step S23: Idle Stop Control is Determined>

The shift-by-wire control unit 30 determines whether or not the idle stop control is being presently executed on the basis of the input from the ISS control unit 35.

Where the idle stop control is being executed, the processing advances to step S24.

Where the idle stop control is not executed, the processing ends (return).

<S24: Restart Prohibition is Determined>

The shift-by-wire control unit 30 determines whether or not the restart prohibition state is assumed on the basis of the input from the ISS control unit 35.

Where the restart prohibition state is assumed, the processing advances to step S25.

Where the restart prohibition state is not assumed, the processing ends (return).

<S25: Forward-Reverse Clutches are Open, Inhibitor Circuit is Set ON>

The shift-by-wire control unit 30 sets the forward clutch and reverse clutch of the automatic transmission to the disengaged state, controls the inhibitor circuit (not shown in the figure) that inhibits the energizing of the stator motor in the D range in the usual state, and sets a state in which the stator motor can be energized in response to the engine start operation, which is performed by the driver with the ignition switch, even in the D range.

The processing then advances to step S26.

<Step S26: Slope Value is Determined>

The shift-by-wire control unit 30 determines the slope value, in the forward-rearward direction, of the road where the vehicle is presently stopped on the basis of the input from the forward-rearward G sensor 37. When the slope value is equal to or greater than a predetermined threshold, the processing advances to step S17.

When the slope value is less than the threshold, the processing ends (return).

<Step S27: Vehicle Speed is Determined>

The shift-by-wire control unit 30 determines the present vehicle speed on the basis of the input from the vehicle speed sensor 38. When the vehicle speed is equal to or less than a predetermined threshold, the processing advances to step S28.

When the vehicle speed is above the threshold, the processing ends (return).

<Step S28: P Range Shift>

The shift-by-wire control unit 30 disengages both the forward clutch and the reverse clutch of the automatic transmission to obtain a P range state in which the parking lock mechanism is locked.

In this case, the parking lock mechanism may be locked, or instead of locking the parking lock mechanism, it is possible to transmit an actuation request signal to either or both the electric parking brake control unit 40 and the brake control unit 50 and set either or both the parking brake 41 and the service brake 51 in the brake state.

The processing then ends (return).

The following effects can be obtained in the above-described embodiment.

(1) When the driver's door is open or the driver's seatbelt is not buckled and the vehicle start preparation is incomplete, the vehicle can be prevented from moving and safety can be increased by shifting to the N range or P range.

The door switch and seatbelt switch used for such control are usually provided at a typical vehicle, and it is not necessary to install additionally new sensors or switches.

(2) When the voltage supplied to the system drops and the CPU or actuator for control can malfunction, the vehicle is prevented from running and reliability and safety can be ensured by shifting to the N range or P range.

(3) When the automatic restart of the engine performed by the idle stop control is prohibited for some reason, the starter motor can be driven without manual switching to the non-running range by the driver, the operation load on the driver can be reduced, and the driver can be prevented from falling into panic, by shifting to the N range or P range and setting the inhibitor circuit ON.

(4) Where the vehicle is on a slope with a slope value equal to or greater than a predetermined value when the above-described types of control are executed, the vehicle can be prevented from moving by actuating some or all of the parking lock mechanism, parking brake, and service brake.

(5) When the ignition switch is OFF and the vehicle speed is equal to or higher than a predetermined value, by prohibiting the self-shut, it is possible to prevent the self-shut from being actuated and making control impossible even when a failure of the ignition switch or the wiring thereof occurs.

[Variation]

The present invention is not limited to the above-described embodiment and various changes and modifications are possible. Those changes and modifications are also included in the technical scope of the present invention.

For example, the configuration of the shift-by-wire control system is not limited to the configuration of the above-described embodiment and can be changed as appropriate.

For example, the forward and reverse clutches are disengaged according to the state of the driver's door and driver's seatbelt in the embodiment. Alternatively, the state of other doors or seatbelts may be taken into account for control.

What is claimed is:

1. A shift-by-wire control system, comprising:
    a range switching device to switch an engagement or a disengagement of a forward engagement element and a reverse engagement element by an actuator;
    a range switching operation unit by which a driver inputs a range switching operation;
    a range switching control unit to control the actuator of the range switching device on a basis of a state of the range switching operation unit; and
    a vehicle start preparation state determination unit for determining a start preparation state of a vehicle,
        wherein, when the vehicle start preparation state determination unit determines that the vehicle start preparation state is incomplete, the range switching control unit executes a running prohibition control by which the forward engagement element and the reverse engagement element are all disengaged, regardless of the state of the range switching operation unit, and
        wherein the range switching control unit executes the running prohibition control when a voltage supplied from a power supply is equal to or less than a predetermined value;
    a self-shut relay that interrupts a power supply to the range switching device after a predetermined time period elapses since an OFF operation of an ignition switch; and
    a self-shut prohibition unit that prohibits the interruption of the power supply by the self-shut relay, regardless of a state of an input signal from the ignition switch, when a running speed of the vehicle is equal to or higher than a speed predetermined value.

2. The shift-by-wire control system according to claim 1, wherein the vehicle start preparation state determination unit determines that the vehicle start preparation state is incomplete when a driver's seat belt is not buckled.

3. The shift-by-wire control system according to claim 1, wherein the vehicle start preparation state determination unit determines that the vehicle start preparation state is incomplete when a driver's door is open.

4. The shift-by-wire control system according to claim 1, further comprising an idle stop control unit to automatically stop an engine of the vehicle when the vehicle is stopped, to automatically restart the engine according to a vehicle start preparation operation, and to prohibit the automatic restart of the engine when a predetermined automatic restart prohibition condition is fulfilled,
    wherein, when the idle stop control unit prohibits the automatic restart of the engine, the range switching control unit executes the running prohibition control and allows a starter motor to be driven in a response to an engine start operation by the driver.

5. The shift-by-wire control system according to claim 1, wherein an output shaft of an automatic transmission is locked by a parking lock mechanism in a case where a road slope in a front-rear direction is equal to or greater than a slope predetermined value when the vehicle is stopped and the running prohibition control is executed.

6. The shift-by-wire control system according to claim 1, wherein brake devices provided at wheels are set to a braking state in a case where a road slope in a front-rear direction is equal to or greater than a slope predetermined value when the vehicle is stopped and the running prohibition control is executed.

7. The shift-by-wire control system according to claim 1, further comprising:
    a controller configured to disengage the forward engagement element and the reverse engagement element to a state that a parking lock mechanism is locked when the vehicle start preparation state is incomplete, a road slope in a front-rear direction is equal to or greater than a slope predetermined value, and a running speed of the vehicle is equal to or higher than a speed predetermined value,
    wherein the controller is further configured to disengage the forward engagement element and the reverse engagement element to a state that the parking lock mechanism is released when the vehicle start preparation state is incomplete, the road slope in the front-rear direction is equal to or greater than the slope predetermined value, and the running speed of the vehicle is less than the speed predetermined value.

8. A shift-by-wire control system, comprising:
    a range switching device to switch an engagement or a disengagement of a forward engagement element and a reverse engagement element by an actuator;
    a range switching operation unit by which a driver inputs a range switching operation;
    a range switching control unit to control the actuator of the range switching device on a basis of a state of the range switching operation unit, wherein the range switching control unit executes a running prohibition control by which the forward engagement element and the reverse engagement element are all disengaged, regardless of the state of the range switching operation unit, when a voltage supplied form a power supply is equal to or less than a predetermined value;
    a self-shut relay that interrupts a power supply to the range switching device after a predetermined time period elapses since an OFF operation of an ignition switch; and
    a self-shut prohibition unit that prohibits the interruption of the power supply by the self-shut relay, regardless of a state of an input signal from the ignition switch, when a running speed of the vehicle is equal to or higher than a speed predetermined value.

9. The shift-by-wire control system according to claim 8, wherein an output shaft of an automatic transmission is locked by a parking lock mechanism in a case where a road slope in a front-rear direction is equal to or greater than a slope predetermined value when the vehicle is stopped and the running prohibition control is executed.

10. The shift-by-wire control system according to claim 8, wherein brake devices provided at wheels are set to a braking state in a case where a road slope in a front-rear direction is equal to or greater than a slope predetermined value when the vehicle is stopped and the running prohibition control is executed.

11. The shift-by-wire control system according to claim 8, further comprising:
- a controller configured to disengage the forward engagement element and the reverse engagement element to a state that a parking lock mechanism is locked when the running prohibition control is executed, a road slope in a front-rear direction is equal to or greater than a slope predetermined value, and a running speed of the vehicle is equal to or higher than a speed predetermined value,
- wherein the controller is further configured to disengage the forward engagement element and the reverse engagement element to a state that the parking lock mechanism is released when the running prohibition control is executed, the road slope in the front-rear direction is equal to or greater than the slope predetermined value, and the running speed of the vehicle is less than the speed predetermined value.

12. A shift-by-wire control system, comprising:
- a range switching device to switch an engagement or a disengagement of a forward engagement element and a reverse engagement element by an actuator;
- a range switching operation unit by which a driver inputs a range switching operation;
- a range switching control unit to control the actuator of the range switching device on a basis of a state of the range switching operation unit; and
- an idle stop control unit to automatically stop an engine of the vehicle when the vehicle is stopped, to automatically restart the engine according to a vehicle start preparation operation, and to prohibit the automatic restart of the engine when a predetermined automatic restart prohibition condition is fulfilled,
- wherein, when the idle stop control unit prohibits the automatic restart of the engine, the range switching control unit executes a running prohibition control by which the forward engagement element and the reverse engagement element are all disengaged and allows a starter motor to be driven in a response to an engine start operation by the driver, regardless of the state of the range switching operation unit; a self-shut relay that interrupts a power supply to the range switching device after a predetermined time period elapses since an OFF operation of an ignition switch; and a self-shut prohibition unit that prohibits the interruption of the power supply by the self-shut relay, regardless of a state of an input signal from the ignition switch, when a running speed of the vehicle is equal to or higher than a speed predetermined value.

13. The shift-by-wire control system according to claim 12, wherein an output shaft of an automatic transmission is locked by a parking lock mechanism in a case where a road slope in a front-rear direction is equal to or greater than a slope predetermined value when the vehicle is stopped and the running prohibition control is executed.

14. The shift-by-wire control system according to claim 12, wherein brake devices provided at wheels are set to a braking state in a case where a road slope in a front-rear direction is equal to or greater than a slope predetermined value when the vehicle is stopped and the running prohibition control is executed.

15. The shift-by-wire control system according to claim 12, further comprising:
- a controller configured to disengage the forward engagement element and the reverse engagement element to a state that a parking lock mechanism is locked when the running prohibition control is executed, a road slope in a front-rear direction is equal to or greater than a slope predetermined value, and a running speed of the vehicle is equal to or higher than a speed predetermined value,
- wherein the controller is further configured to disengage the forward engagement element and the reverse engagement element to a state that the parking lock mechanism is released when the running prohibition control is executed, the road slope in the front-rear direction is equal to or greater than the slope predetermined value, and the running speed of the vehicle is less than the speed predetermined value.

* * * * *